(12) United States Patent
Hosur

(10) Patent No.: US 7,149,253 B2
(45) Date of Patent: Dec. 12, 2006

(54) WIRELESS COMMUNICATION

(75) Inventor: Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1096 days.

(21) Appl. No.: 09/813,532

(22) Filed: Mar. 21, 2001

(65) Prior Publication Data

US 2001/0033623 A1   Oct. 25, 2001

Related U.S. Application Data

(60) Provisional application No. 60/190,822, filed on Mar. 21, 2000.

(51) Int. Cl.
*H04B 7/02* (2006.01)

(52) U.S. Cl. ............... 375/267; 375/136; 375/260; 375/340; 375/148; 375/280; 370/329; 370/525; 455/69

(58) Field of Classification Search ........ 375/267, 375/136, 260, 340, 148, 280; 370/329, 525; 455/69
See application file for complete search history.

(56) References Cited

U.S. PATENT DOCUMENTS

| | | | | |
|---|---|---|---|---|
| 5,088,113 A * | 2/1992 | Wei | | 375/280 |
| 5,912,931 A * | 6/1999 | Matsumoto et al. | | 375/340 |
| 6,005,876 A * | 12/1999 | Cimini et al. | | 370/525 |
| 6,131,016 A * | 10/2000 | Greenstein et al. | | 455/69 |
| 6,178,194 B1 * | 1/2001 | Vasic | | 375/136 |
| 6,185,258 B1 * | 2/2001 | Alamouti et al. | | 375/260 |
| 6,424,679 B1 * | 7/2002 | Dabak et al. | | 375/267 |
| 6,483,821 B1 * | 11/2002 | Dabak et al. | | 370/329 |
| 6,728,302 B1 * | 4/2004 | Dabak et al. | | 375/148 |

OTHER PUBLICATIONS

Tarokh, V. et al.; New Detection Schemes for Transmit Diversity with no Channel Estimation; IEEE 1998 ICUPC Conference; Oct. 5-9, 1998; pp. 917-920.*
Alamouti, S.M.; A Simple Transmit Diversity Technique for Wireless Communications; IEEE Journal on Selected Areas in Communications; vol. 16, No. 8; 1998; pp. 1451-1458.*
Lee, D. et al.; Antenna Diversity for an OFDM System in a Fading Channel; IEEE Military Communications Conference Proceedings; 1999; pp. 1104-1109.*
Garcia, M.J.F. et al; Joint 2D-Pilot-Symbol-Assisted-Modulation and Decision-Directed Frequency Synchronization Schemes for Coherent OFDM; IEEE Proceeding on Communications; 2000; pp. 2961-2964.*
Li et al.; Channel Estimation for OFDM Systems with Transmitter Diversity in Mobile Wireless Channels; IEEE Journal on Selected Areas of Communications; vol. 17, No. 3; Mar. 1999.*
Lee, K.F. et al.; A space-time coded transmitter diversity technique for frequency selective fading channels; Mar. 16-17, 2000; Proceedings of the 2000 IEEE Sensor Array and Multichannel Signal Processing Workshop; pp. 149-152.*

* cited by examiner

*Primary Examiner*—Chieh M. Fan
*Assistant Examiner*—Sudhanshu C. Pathak
(74) *Attorney, Agent, or Firm*—Carlton H. Hoel; W. James Brady; Frederick J. Telecky, Jr.

(57) ABSTRACT

A frequency division multiplexing wireless transmission on two or more antennas with the set of symbols on subcarriers of a burst transmitted by one antenna transformed into another set of symbols on the subcarriers for the corresponding burst transmitted by another antenna. This helps overcome fading of the wireless channel by diversity.

12 Claims, 7 Drawing Sheets

WIRELESS COMMUNICATION

CROSS-REFERENCE TO RELATED APPLICATIONS

This application claims priority from provisional application Ser. No. 60/190,822, filed Mar. 21, 2000.

BACKGROUND OF THE INVENTION

The invention relates to electronic devices, and more particularly to wireless communication.

Demand for wireless information services via cell phones personal digital assistants (PDAs), and Internet appliances (IA) plus wireless networking among notebook computers is rapidly growing. Various protocols for wireless communication have been proposed, including the 802.11 standards for wireless networking at high data rates (e.g., 20 Mbps). In particular, Orthogonal Frequency Division Multiplexing (OFDM) has been suggested for the 802.11 wireless local area network 5 GHz band standard. For transmission, OFDM essentially splits a data stream into N parallel substreams with each substream on its own subcarrier (frequency division multiplexing). The subcarriers are taken to be initially orthogonal by frequency selection. Thus the subcarriers may overlap spectrally because the orthogonality allows a receiver to separate them. But channel dispersion disrupts the orthogonality.

OFDM with pilot symbols aided schemes help overcome the sensitivity to frequency offsets between a transmitter and receiver oscillators and Doppler effects. Garcia et al, Joint 2D-Pilot-Symbol-Assisted-Modulation and Decision-Directed Frequency Synchronization Schemes for Coherent OFDM, IEEE . . . 2961 (2000).

Lee et al, Antenna Diversity for an OFDM System in a Fading Channel, IEEE Military Comm. Conf. Proc. (MIL-COM) 1104 (1999) considers multiple receiver antennas and applies various combining methods for receiving OFDM transmissions.

SUMMARY OF THE INVENTION

The present invention provides a wireless system with orthogonal frequency division multiplexing with two or more transmission antennas and the subcarrier symbols of a burst from one antenna being a transformed version of the subcarrier symbols of the corresponding burst from another antenna.

This has advantages resistance to fading by simple symbol transformations.

BRIEF DESCRIPTION OF THE DRAWINGS

The drawings are heuristic for clarity.

DETAILED DESCRIPTION OF THE PREFERRED EMBODIMENTS

1. Overview

Figure 2:
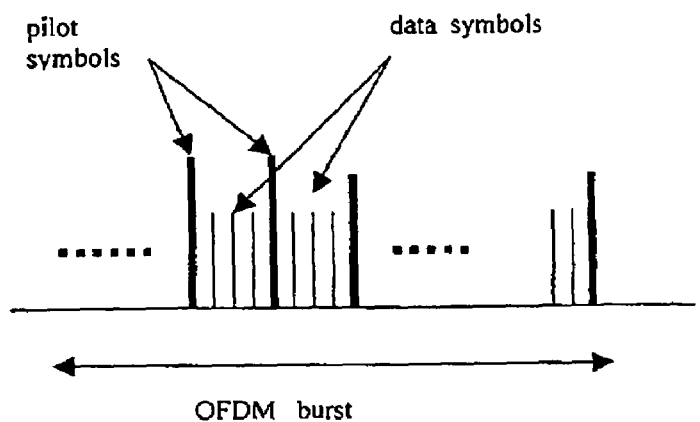
FIG. 2 shows subcarrier structure of a burst.
Figure 10:
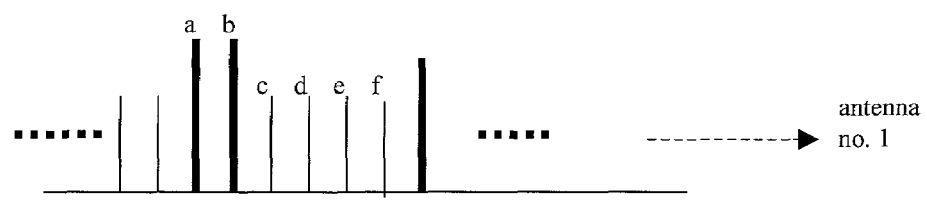
Figure 11:
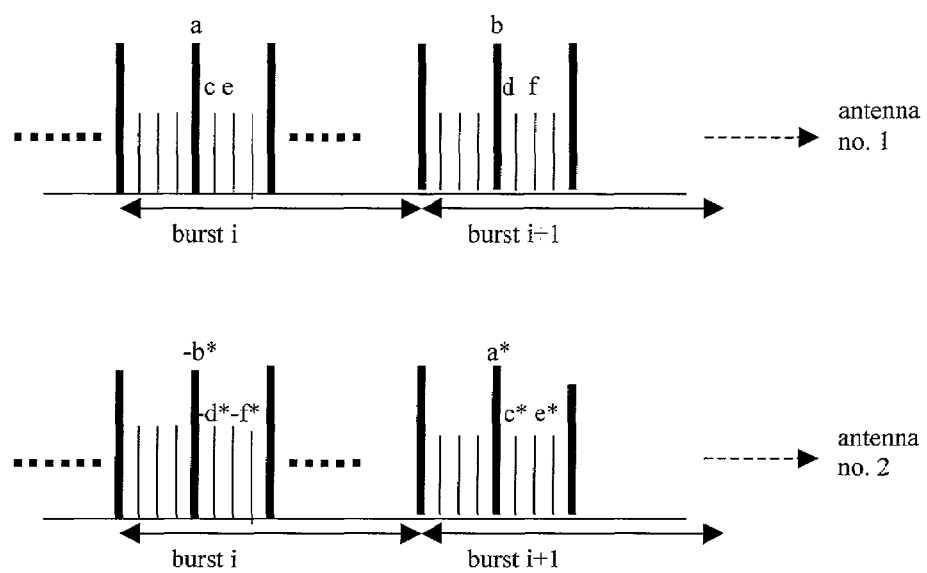

Preferred embodiment systems provide antenna diversity for orthogonal frequency division multiplexing (OFDM) using pilot-symbol aided frequency synchronization by pairing subcarriers and applying a transformation (e.g., rotation and complex conjugation) to the data (pilot) symbol pair on the subcarrier pair for transmission on a second antenna. FIG. 2 shows the subcarrier structure of a transmission burst, and FIGS. 10–11 illustrates pilot and data symbols and their transformation within a burst and across bursts, respectively. This provides diversity and better performance than just maximal ratio combining of the same data on the same subcarrier from the two antennas. The subcarrier pairing extends to higher order groupings and transformations for larger antenna arrays.

Reception of the transmissions from the multiple antennas utilizes the orthogonal frequency division multiplexing character of the transmissions.

2. Two antennas, adjacent subcarriers preferred embodiments

Figure 1:
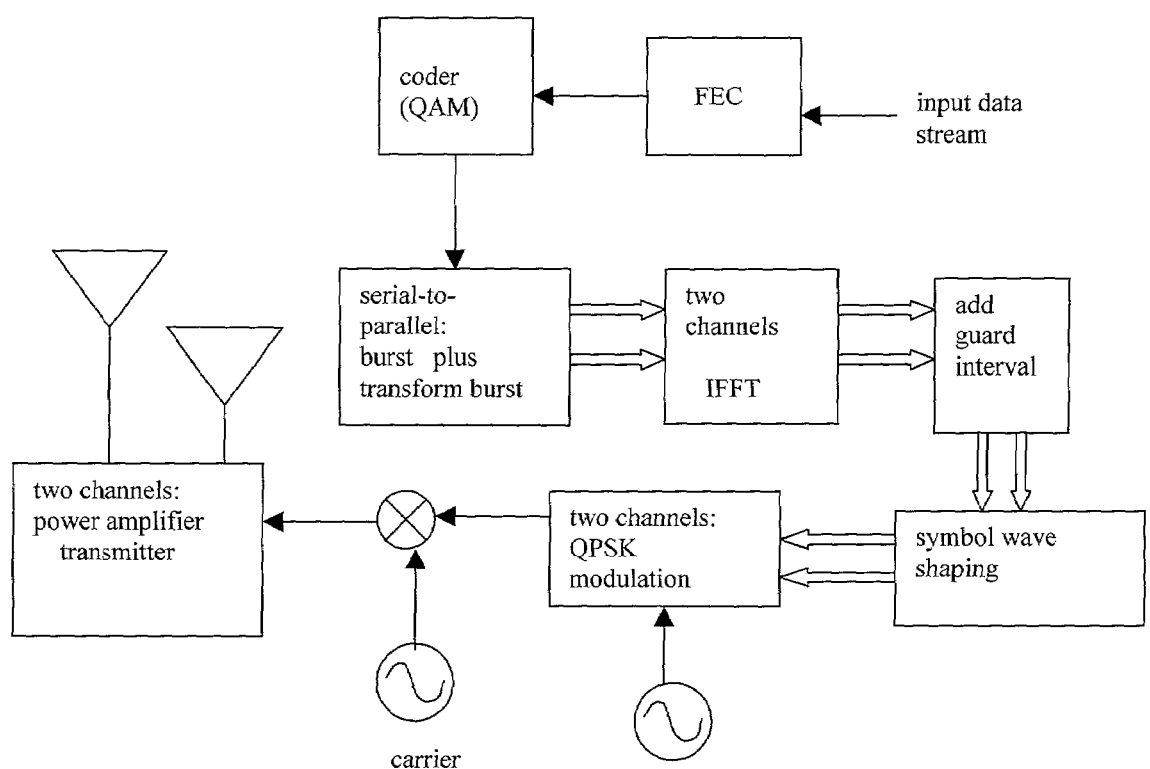
FIG. 1 shows a preferred embodiment transmitter.

FIG. 1 illustrates a preferred embodiment system which uses a preferred embodiment method of data space-frequency transmission diversity. The first preferred embodiment proceeds as follows with an input data stream.

(1) Optionally apply forward error correction (e.g., Reed-Solomon or turbo coding) to a binary input data stream.

(2) Encode the input data stream (including forward error correction) into QAM symbols (e.g., for 16-QAM the symbols are $Z_k=x_k+jy_k$ with $x_k$ and $y_k$ from the set $\{\pm 1, \pm 3\}$).

(3) Interleave the data symbols with the pilot symbols. Partition the QAM symbols into bursts of N symbols so each burst has $N_{data}$ data symbols and $N_{pilot}$ pilot symbols; see FIG. 2 heuristically illustrates the interleaved symbols in a burst for the case of every fourth symbol as a pilot symbol. Typical values include N=64 symbols in a burst consisting of $N_{data}$=48 data symbols and $N_{pilot}$=16 pilot symbols. Note that possibly extra 0 power subcarriers may be required at the frequency ends of a burst for regulatory reasons; that is, the highest and lowest frequency subcarriers may have 0 power. In this case $N=N_{data}+N_{pilot}+N_{zeros}$ where N is the size of the IFFT for step (5).

Figure 3:
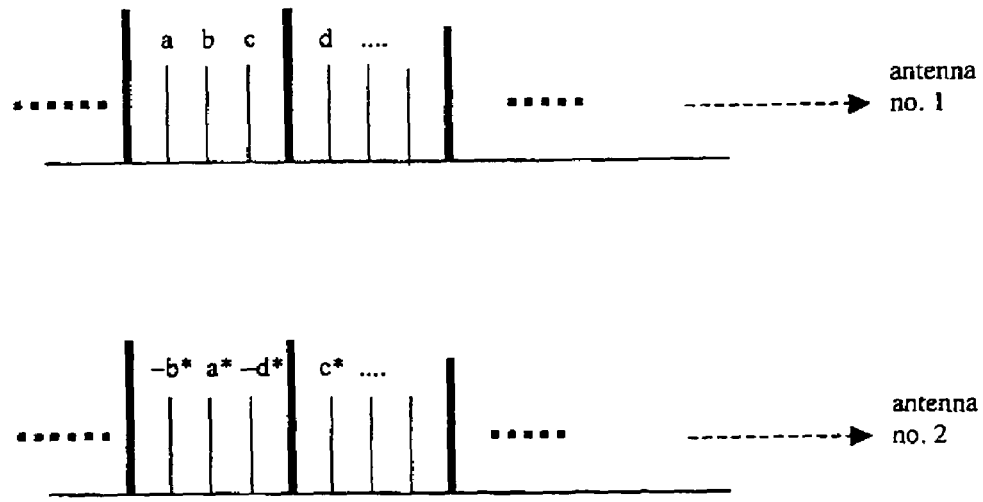
FIGS. 3–13 illustrate preferred embodiment subcarrier diversity pairings.

(4) For each burst from step (3) form a transformed burst by changing each pair (a, b) of successive data symbols into the pair (−b*, a*). That is, the $N_{data}$ data symbols form $N_{data}/2$ pairs, and for each pair perform the complex conjugation and a π/2 vector rotation. This creates a transformed burst of symbols made up of the same $N_{pilot}$ pilot symbols but the new $N_{data}/2$ pairs of transformed data symbols. FIG. 3 illustrates the two bursts.

(5) Apply an N-point inverse fast Fourier transform (IFFT) to each of the N-subcarrier bursts from steps (3) and (4). The subcarrier number variable k in a burst has the range 0 to N−1 (e.g., 63) and corresponds to frequencies in the range 0 to (N−1)/T where T is the period of a burst, for example 10 microseconds. The inverse transformed time variable has the range 0 to T in increments of T/N. That is IFFT of a burst with symbols $z_0, z_1, \ldots, z_{N-1}$ for t in the range [0,T] is:

$$u(t)=\Sigma z_k \, e^{j2\pi kt/T} \text{ with the sum over } 0 \leq k \leq N-1$$

(6) Optionally, add a guard interval (cyclic redundancy) to precede the u(t) for each burst from step (5). Then as in FIG. 1 use the u(t) for each burst to QPSK modulate an intermediate frequency carrier followed by step up of frequency to the 2.5 or 5 GHz carrier center frequency. Transmit each burst modulated carrier on a corresponding antenna. Alternatively, the u(t) for each burst can directly modulate the carrier.

The reception of the transmitted signal from transmitter step (6) includes the following steps.

(1) Demodulated and apply FFT to recover for each burst subcarrier a linear combination of the symbols transmitted by the two antennas for the subcarrier. That is, for the subcarrier from transmitter steps (3)–(4) with transmitted symbols a and $-b^*$, the received signal is $r_1 = \alpha a + \beta(-b^*) + n_1$ where $\alpha$ is the attenuation plus phase shift of the channel from the first antenna to the receiver, $\beta$ is the attenuation plus phase shift of the channel from the second antenna to the receiver, and $n_1$ is the received noise in this subcarrier. Similarly, for the adjacent subcarrier with transmitted symbols b and $a^*$ the received signal is $r_2 = \alpha b + \beta a^* + n_2$.

(2) Use the pilot symbols to estimate the channel parameters. For example, find estimates $\hat{\alpha}$ and $\hat{\beta}$ from the (known) received pilot symbols in the pilot symbol subcarriers closest to the subcarriers with data symbols a and b; or apply an interpolate method using channel estimates from pilot symbols of subcarriers above and below the subcarrier of interest. Then find estimates $\hat{a}$ and $\hat{b}$ for the data symbols a and b in terms of the received signals; that is, solve for a and b in the set of linear equations:

$$r_1 \hat{\alpha} a + \hat{\beta}(-b^*) + n_1$$

$$r_2 \hat{\alpha} b + \hat{\beta} a^* + n_2.$$

Take the complex conjugate of the second equation and ignoring $n_j$ to yield a set of two linear equations for the unknowns a and $b^*$. Then solve by matrix inversion:

$$\hat{a} = (\hat{\alpha}^* r_1 + \hat{\beta} r_2^*)/(|\hat{\alpha}|^2 + |\hat{\beta}|^2)$$

$$\hat{b}^* = (-\hat{\beta}^* r_1 + \hat{\alpha} r_2^*)/(|\hat{\alpha}|^2 + |\hat{\beta}|^2)$$

The complex conjugate of the second equation yields the estimate for b:

$$\hat{b} = (-\hat{\beta} r_1^* + \hat{\alpha}^* r_2)/(|\hat{\alpha}|^2 + |\hat{\beta}|^2)$$

These estimates for a and b can be compared with the alternative approach of using the first subcarrier for data symbol a and the second subcarrier for the data symbol b in both transmitter antennas. In particular, let $s_1$ and $s_2$ be the received signals for the first and second subcarriers:

$$s_1 = \hat{\alpha} a + \hat{\beta} a + n_1.$$

$$s_2 = \hat{\alpha} b + \hat{\beta} b + n_2.$$

Thus if $\hat{\alpha} + \hat{\beta}$ is small even though $|\hat{\alpha}|^2 + |\hat{\beta}|^2$ is not small (i.e., fading from the two channels destructively interfering), $s_1$ and $s_2$ are dominated by noise $n_1$ and $n_2$, respectively. In contrast, the preferred embodiment has $r_1$ and $r_2$ dominated by $n_1$ and $n_2$ only when both $\hat{\alpha} a + \hat{\beta}(-b^*)$ and $\hat{\alpha} b^* + \hat{\beta}(a^*)$ are small, but this implies $|\hat{\alpha}|^2 + |\hat{\beta}|^2$ is small. That is, the preferred embodiment assignment of a pair of data symbols to a pair of subcarriers can overcome fading.

3. Two antennas, pilot symbol pairing preferred embodiment

Figure 4:
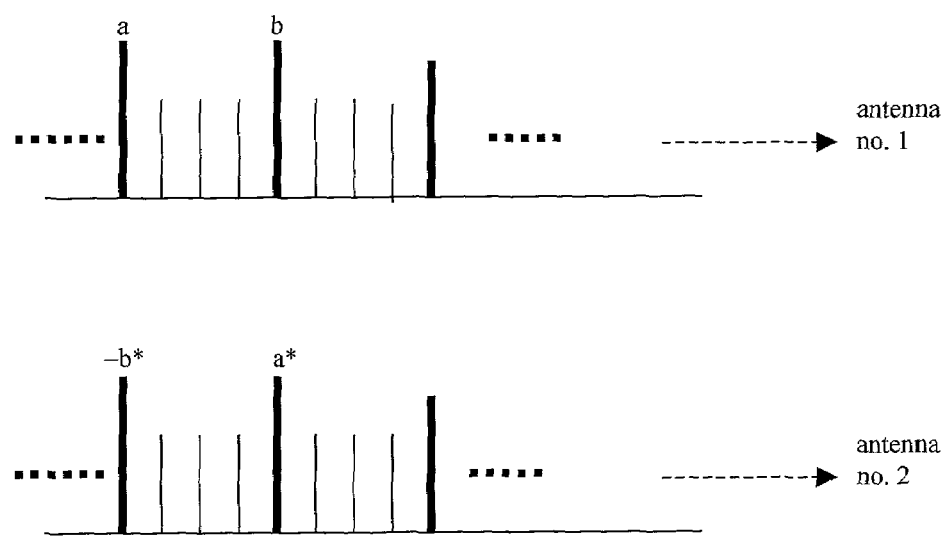

FIG. 4 illustrates a preferred embodiment with pairs of pilot symbols of a burst transformed to create a second burst analogous to the prior preferred embodiment of transformed pairs of data symbols. This encoding of the pilot symbols provides more efficient channel estimation.

4. Two antennas, alternate pilot symbol preferred embodiment

Figure 5:
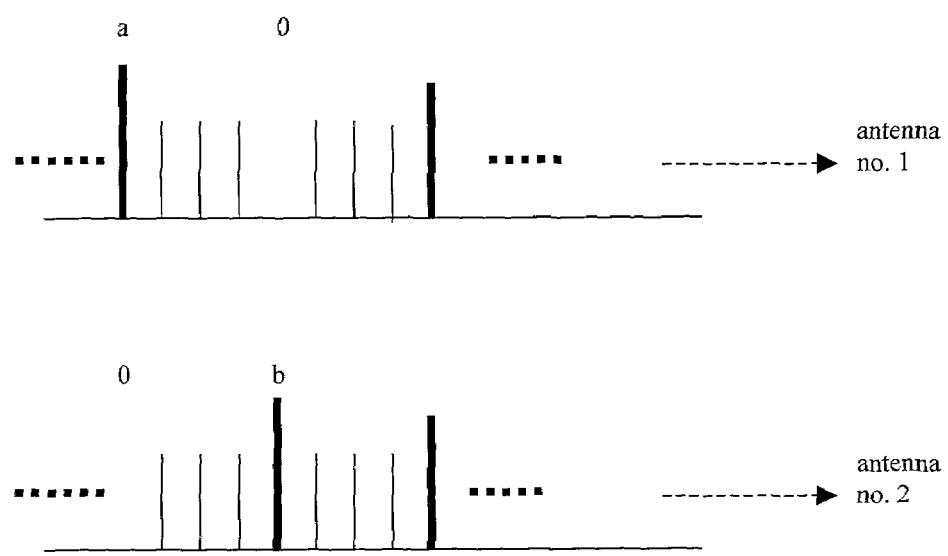

FIG. 5 shows a variation of pilot symbol encoding in that a pair of pilot symbols on subcarriers in a burst is split with a burst for the first antenna including one subcarrier with one pilot symbol and the other subcarrier with a 0 symbol, whereas the burst for the second antenna has the first subcarrier with a 0 symbol and the other subcarrier with the second pilot symbol.

5. Two antennas, adjacent pilot symbol pairing preferred embodiment

Figure 6:
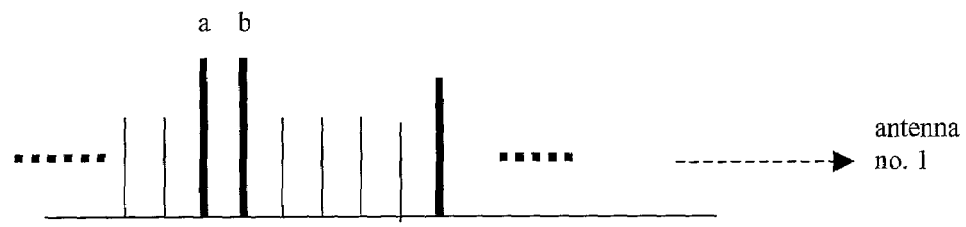
Figure 6:
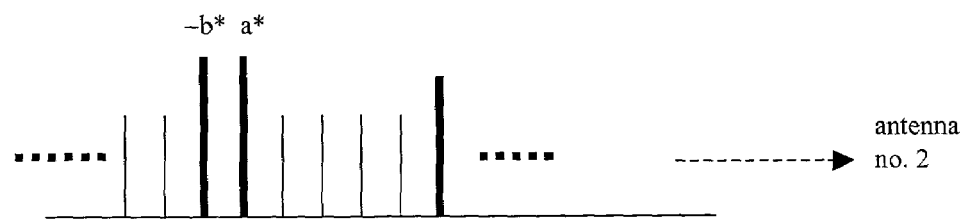

FIG. 6 illustrates another preferred embodiment with pairs of pilot symbols of a burst to transformed to create a second burst similar to the FIG. 5 preferred embodiment but with the pilot symbols assigned to adjacent subcarriers. This encoding of the pilot symbols provides more efficient channel estimation.

6. Two antennas, two bursts transformation preferred embodiment

Figure 7:
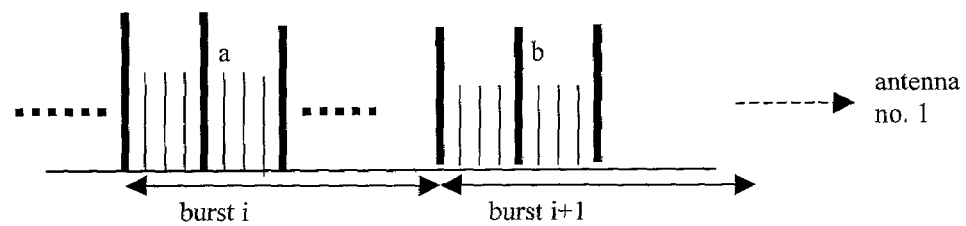
Figure 7:
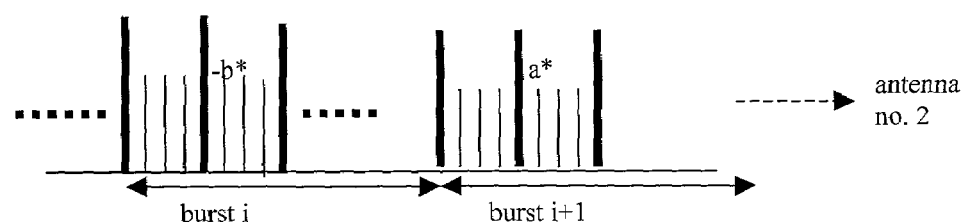

FIG. 7 shows a preferred embodiment with pairs of data symbols on the same subcarrier in a pair of bursts transformed to create a second pair of bursts for a second antenna. In this preferred embodiment the received signals for the single subcarrier for the first and second bursts are again:

$$r_1 = \hat{\alpha} a + \hat{\beta}(-b^*) + n_1$$

$$r_2 = \hat{\alpha} b + \hat{\beta} a^* + n_2.$$

where the subscript refers to the burst rather than the subcarrier. Again the equations are solved to find estimates for the data symbols a and b in terms of the channel estimates and received signals.

7. Two antennas, two bursts with pilots preferred embodiment

Figure 8:
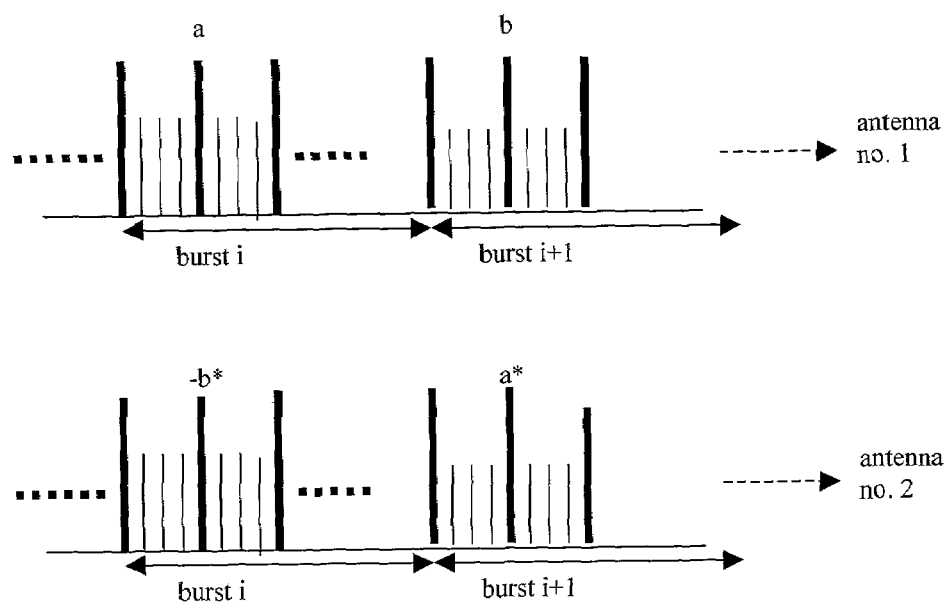

FIG. 8 shows a preferred embodiment with pairs of pilot symbols on the same subcarrier in a pair of bursts transformed to create a second pair of bursts for a second antenna. Analogous to the preferred embodiment of FIG. 7, in this preferred embodiment the received signals for the single subcarrier for the first and second bursts are again:

$$r_1 = \hat{\alpha} a + \hat{\beta}(-b^*) + n_1$$

$$r_2 = \hat{\alpha} b + \hat{\beta} a^* + n_2.$$

where the subscript refers to the burst rather than the subcarrier. Again the equations are solved to find estimates for the data symbols a and b in terms of the channel estimates and received signals.

8. Further two antenna preferred embodiments

Figure 9:
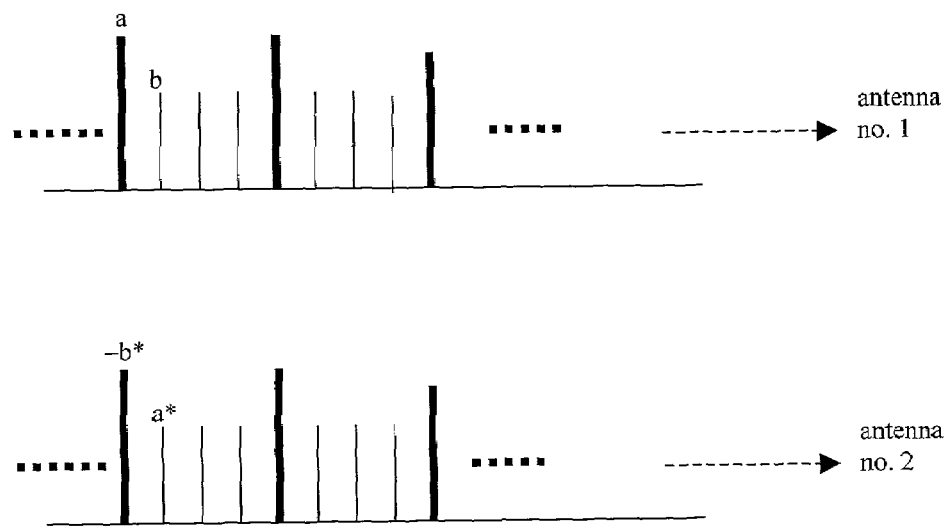

A pair of one pilot symbol and one data symbol can be used in any of the foregoing preferred embodiments; for example, FIG. 9 illustrates a pilot and adjacent data symbol plus the transformed pair.

Figure 12:
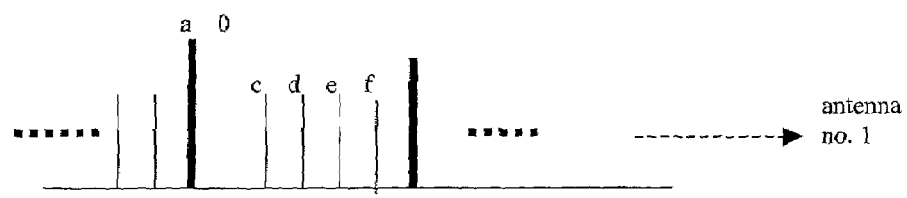
Figure 12:
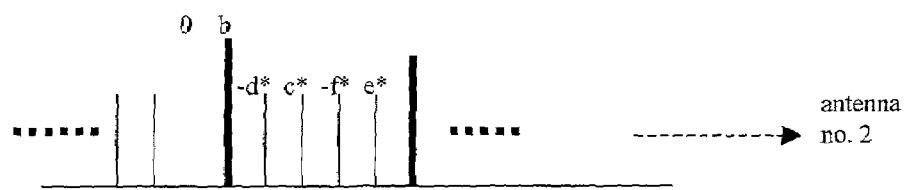
Figure 13:
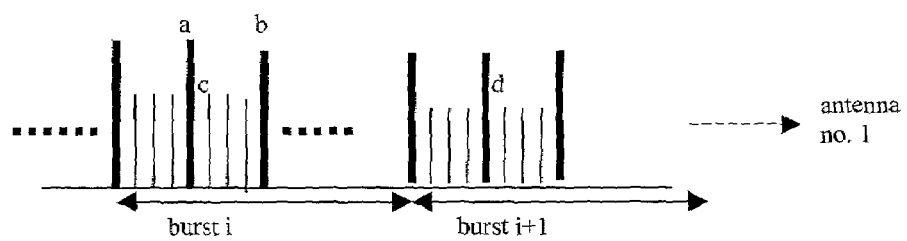
Figure 13:
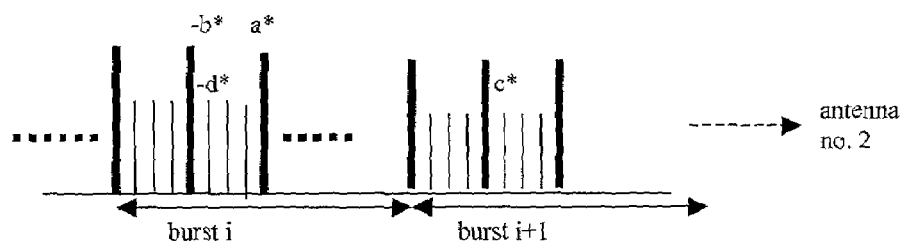

Further, non-adjacent pairs of bursts could be used in the FIGS. 7–8 preferred embodiments, and the mixed data-pilot symbols could also be used in versions of these preferred embodiments. For example, FIG. 12 combines the pilots of FIG. 5 with the data of FIG. 10, and FIG. 13 combines the pilots of FIG. 6 with the data across bursts of FIG. 7.

9. Higher order antenna preferred embodiments

Larger sets of antennas could be used for transmission and corresponding sets of symbols can be transformed in distinct ways to form a multiple bursts for transmission; this extends the pairs of symbols for two antennas. In particular, with four antennas, the data symbols on four subcarriers can be transformed with the resulting 4 by 4 channel estimate coefficient matrix as a positive matrix to solve for the data symbols in terms of the four subcarrier received signals.

Similarly, with groups of four symbols, the transformation can involve interchange among four distinct bursts.

10. Modifications

The preferred embodiments may be varied while retaining the feature of a transformed set of symbols transmitted on a other antennas for space-frequency diversity.

For example, a channel estimate could be obtained with initial or periodic bursts of all pilot symbols. A separate pilot channel may be available for channel estimates. The burst sizes and the numbers of and mixture of pilot symbols, data symbols, and zero power subcarriers may be varied, and so forth. Indeed, the following are convenient mixtures of numbers of pilot and data symbols per burst:

N=128, Npilot=16, Ndata=90
N=256, Npilot=16, Ndata=198
N=256, Npilot=32, Ndata=180
N=512, Npilot=32, Ndata=432
N=512, Npilot=64, Ndata=396
N=1024, Npilot=64, Ndata=864
N=1024, Npilot=128, Ndata=792

Also, not all of the subcarrier symbols (pilot and data) in a burst need to be paired up and transformed for the second antenna transmission. That is, some subcarrier symbols may be paired, $(a_i, b_i)$, and transformed to $(-b_i^*, a_i^*)$ for the second antenna transmission, but other subcarrier symbols, $(a_k, b_k)$, not transformed and simply repeated as $(a_k, b_k)$ for the corresponding subcarriers in the second antenna transmission.

What is claimed is:

1. A method of transmission, comprising:
   (a) providing a set of N symbols where N is an integer greater than 1;
   (b) providing M−1 transformations of said set of N symbols where M is an integer greater than 1;
   (c) transmitting said set of N symbols on N subcarriers in a burst from a first antenna; and
   (d) transmitting, simultaneously set of N symbols, each of said M−1 transformations of set of N symbols on N subcarriers in a burst from a corresponding one of M−1 antennas.

2. The method of claim 1, wherein:
   (a) said set of N symbols includes pilot symbols and data symbols.

3. The method of claim 2, wherein:
   (a) M equals 2; and
   (b) said M−1 transformations includes a pairwise rotation and complex conjugation of two of said set of N symbols.

4. The method of claim 3, wherein:
   (a) said symbols are QAM symbols.

5. The method of claim 2, wherein:
   (a) N equals 64; and
   (b) 48 of said N symbols are data symbols.

6. The method of claim 4, wherein:
   (a) said set of N symbols is partitioned into N/2 pairs of symbols $(a_i, b_i)$; and
   (b) said M−1 transformation transforms the pairs $(a_i, b_i)$ into the pairs $(-b_i^*, a_i^*)$.

7. A method of transmission, comprising:
   (a) providing first and second sets of N symbols where N is an integer greater than 1;
   (b) providing M−1 transformations of said first set of N symbols and said second set of N symbols where M is an integer greater than 1;
   (c) transmitting said first and second sets of N symbols on N subcarriers in a first and a second burst from a first antenna; and
   (d) transmitting, simultaneously set of N symbols, each of said M−1 transformations of sets of N symbols on N subcarriers in a pair of bursts from a corresponding one of M−1 antennas.

8. The method of claim 7, wherein:
   (a) each set of N symbols includes pilot symbols and data symbols.

9. The method of claim 8, wherein:
   (a) M equals 2; and
   (b) said M−1 transformations includes a pairwise rotation and complex conjugation of two of said set of N symbols.

10. The method of claim 9, wherein:
    (a) said symbols are QAM symbols.

11. The method of claim 8, wherein:
    (a) N equals 64; and
    (b) 48 of said N symbols are data symbols.

12. The method of claim 10, wherein:
    (a) each set of N symbols is partitioned into N/2 pairs of symbols $(a_i, b_i)$; and
    (b) said M−1 transformation transforms the pairs $(a_i, b_i)$ into the pairs $(-b_i^*, a_i^*)$.

* * * * *